Feb. 18, 1969   J. MELPOLDER   3,428,100
WOODEN COLLAR MAKER
Filed Dec. 22, 1966   Sheet 1 of 2
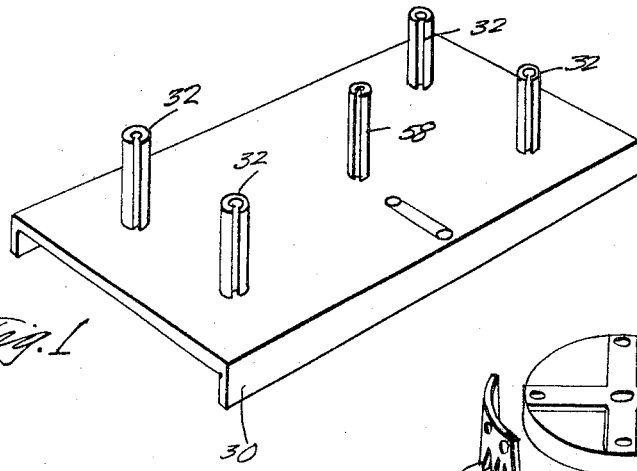
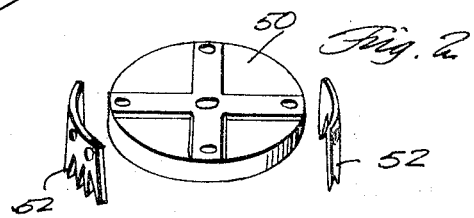
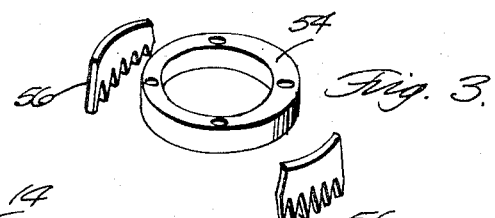
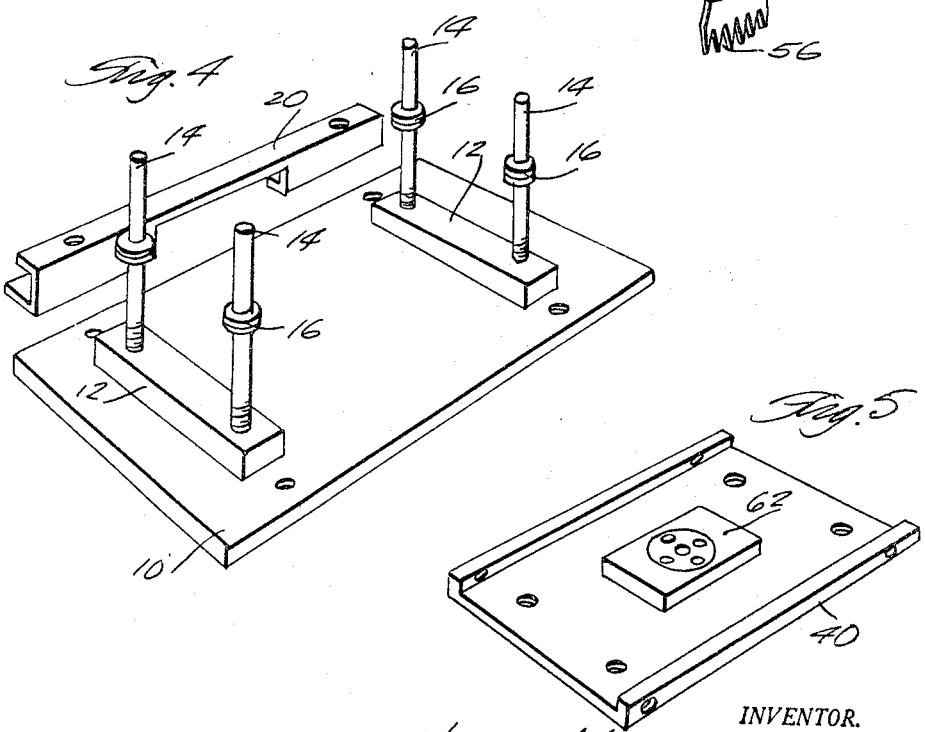
INVENTOR.
JOHN MELPOLDER
BY
Victor J. Evanoff
ATTORNEYS

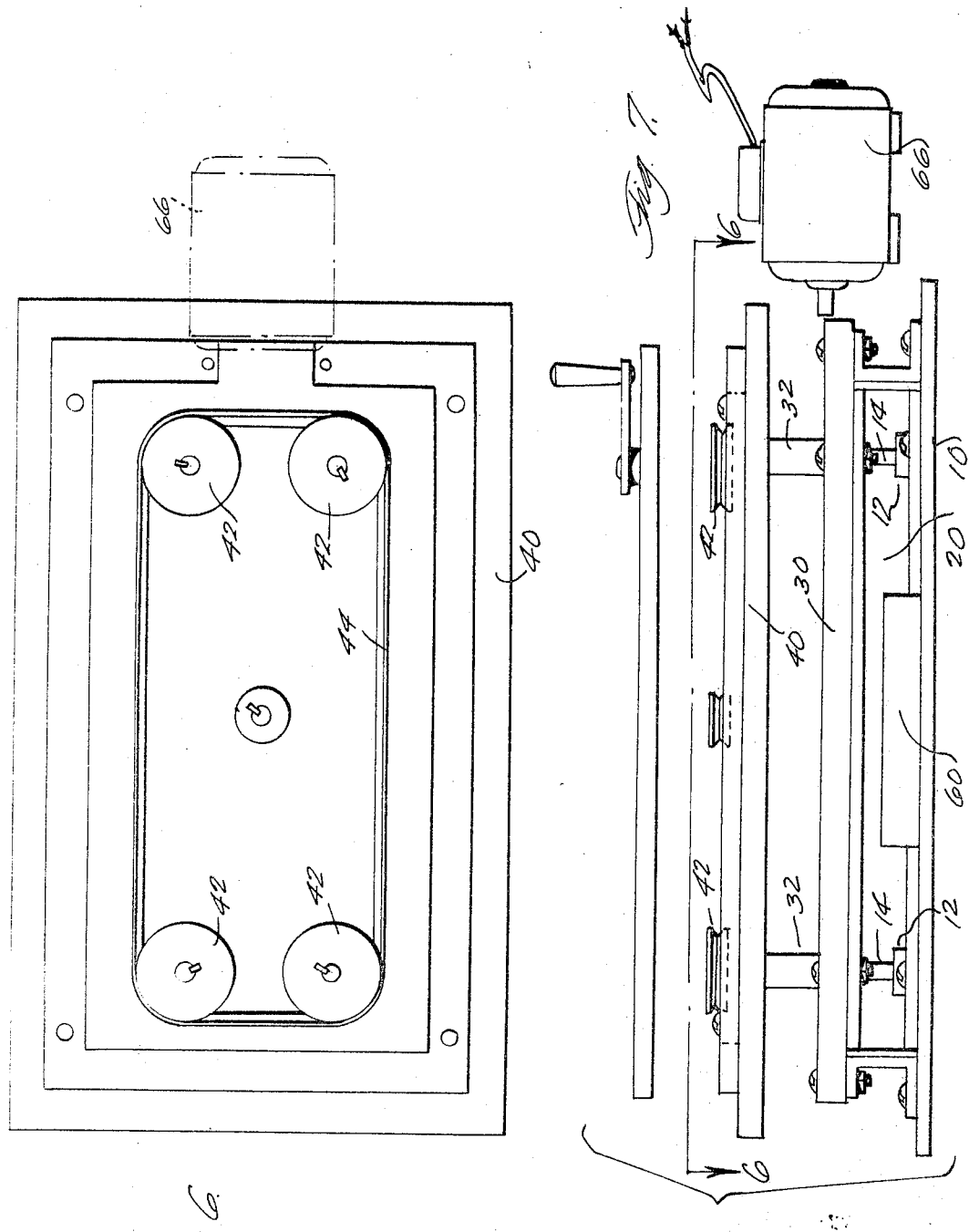

United States Patent Office 3,428,100
Patented Feb. 18, 1969

3,428,100
WOODEN COLLAR MAKER
John Melpolder, P.O. Box 1140,
Grand Rapids, Mich. 49506
Filed Dec. 22, 1966, Ser. No. 603,868
U.S. Cl. 143—85        3 Claims
Int. Cl. B27b 5/12; B27g 15/00

The present invention relates to improved apparatus for making wooden collars and more particularly relates to wooden collar makers that can be constructed of steel components and aluminum components for making wooden collars for metal containers, pails, garbage cans, and bases and covers of general description.

The object of the present invention therefore is to provide a circle cutting machine for wooden sheets material, in which there are provided a simple arrangement of elements to form a combination not found and suggested by the prior art.

A further object of the present invention is to provide wooden collar maker apparatus having an electric motor for driving curved saw elements which are fastened upon a circumference of curved or circular saw wheels so that the collars may be made with facility over the prior art devices.

It is seen that the curved saw wheel holder contemplated by the present invention cooperates with the curved saw wheel as it moves downward by turning the partly threaded bars at the same time and upwardly by turning the bars in the other direction. A wooden block is placed upon the block holder as the curved saw wheel turns around in cutting the circular portion by the curved saw into the wooden block for making the collar or the collars.

The above and other objects and advantages of the invention will become apparent upon full consideration of the following detailed description and accompanying drawings in which:

FIGURE 1 is a perspective view of a base for the wooden collar maker of the present invention showing cylinders placed over bars which are vertically mounted on said base.

FIGURES 2 and 3 are exploded views of a curved saw and curved saw wheel, and a curved saw wheel collar respectively.

FIGURE 4 is a perspective view of the base showing the bar holder and bars mounted thereon.

FIGURE 5 shows a perspective view of the case and ball bearing arrangement.

FIGURE 6 shows a top view of the center cover arrangement, and

FIGURE 7 shows an exploded view in side elevation of the case and ball bearing frame, and electric motor, the center cover, and a top cover, embodying the preferred features of the present invention.

Referring now to the figures, there is illustrated and shown a base 10, having a pair of bars 12, 12 secured thereon and on which there are provided a pair of rotatably disposed threadedly engaging shafts 14, 14. Intermediate the ends of the shafts 14 are rigidly secured to a ring 16 for each shaft as shown in FIGURE 4. The near and far sides of the base 10 are adapted to receive a wall 20 shown in exploded arrangement in FIGURE 4 and in the actual position in FIGURE 7. On the shafts 14, 14 there is mounted the center base or cover member 30 shown in FIGURE 1 and in which the shafts 14, 14 fit within the split cylinders 32, 32.

The case or saw mounted base 40 is seen to be provided with pulleys 42, 42 secured to the shafts 14, 14 for driving the shafts 14 in a common direction and thus raise or lower, accordingly, the case or saw mounted base 40 as may be desired. This is done by a crank arm 46 driving the pulley 42 so that the belt 44 drives the pulleys 42, 42 in raising or lowering the base 40.

Under the center cover base 40, there is mounted the curved saw wheel 50 shown in FIGURE 2 with the curved saw blades 52, 52, and a curved saw wheel collar 54 of smaller outside diameter on which are mounted also curved saw blades 56, 56 by disposing these on a common shaft mounted in the split cylinder 58, a wooden collar may be made where a wooden work piece is inserted within the opening 60. The curved saw wheel 50 is mounted from the ball bearing mounting 62 shown in FIGURE 5. Where it is desired to drive the collar arrangement shown in FIGURE 2, an electric motor 66 shown in FIGURE 7 is provided to which the motor is coupled in a conventional fashion.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:
1. A wooden collar maker comprising a base having bars for supporting vertically extending shafts therein, said shafts being threadedly engaged and secured to said bars,
   wall members mounted on said base to support a center cover member,
   said center cover member receiving said shafts through apertures extending through said cover member,
   a top cover having shaft holes to mate with the shafts of said base,
   a tunnel passing through said wall members between said base and said center cover,
   a block holder disposed to be received within said tunnel for holding a wooden block by a bolt as a work piece onto which a collar is to be cut,
   a ball bearing mounting centrally positioned in the cover member,
   a curved saw wheel holder mounted in said ball bearing mounting,
   and a curved saw wheel moved downwardly by turning the threaded shafts by a crank handle,
   said curved saw wheel having curved saw blades mounted thereon for cutting said collars.
2. The invention of claim 1, wherein a electric motor drives said curved saw wheel.
3. The invention of claim 2, wherein said center cover is driven upwardly and downwardly by belt driven wheels on each of said shafts and drive in unison by a mutually engaging belt.

References Cited

UNITED STATES PATENTS 951,920   3/1910   Smith _____ 144—24
793,145   6/1905   Nolan _____ 144—24 X DONALD R. SCHRAN, Primary Examiner.

U.S. Cl. X.R.
144—20; 77—79; 145—121